Patented July 29, 1930

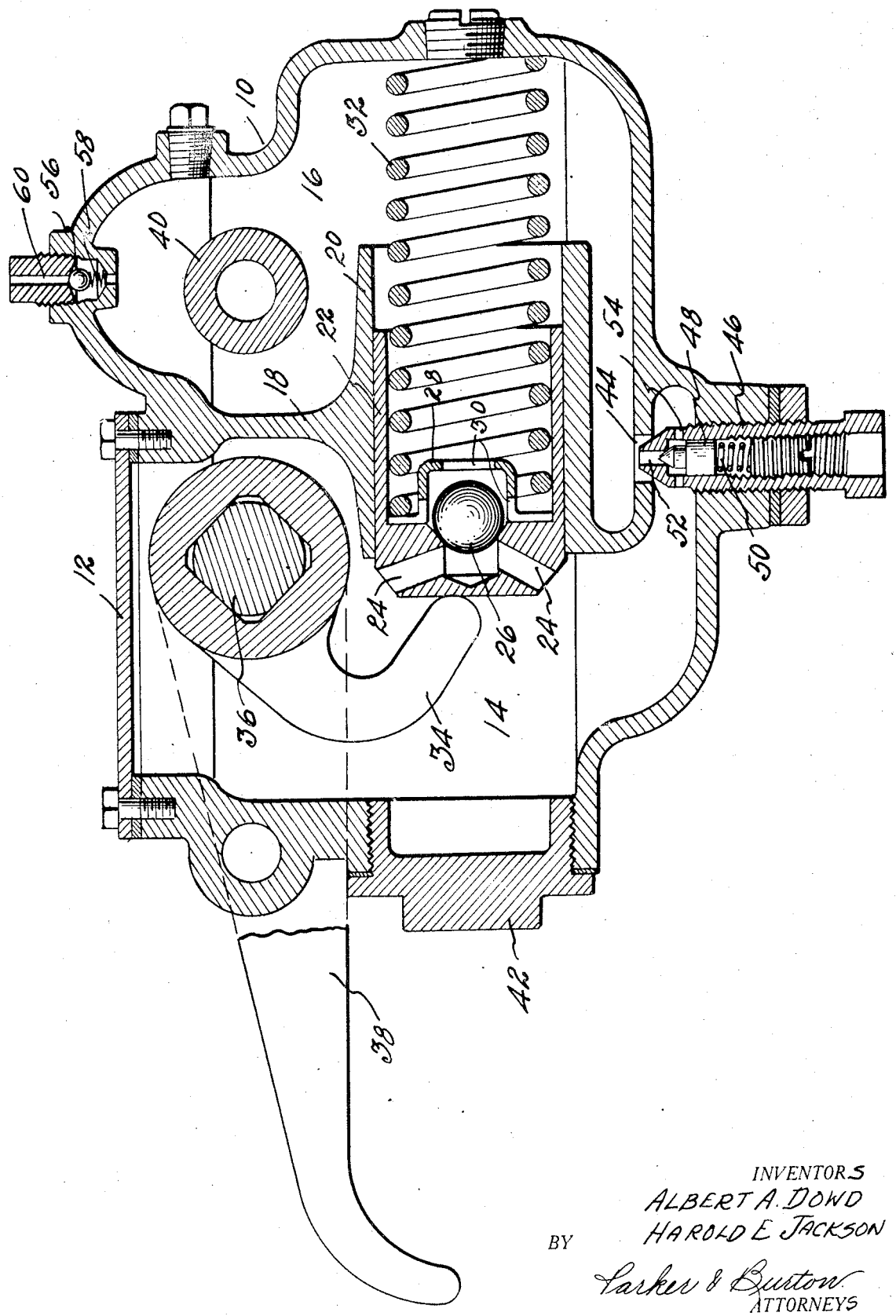

1,771,879

UNITED STATES PATENT OFFICE

ALBERT A. DOWD AND HAROLD E. JACKSON, OF DETROIT, MICHIGAN; SAID DOWD ASSIGNOR TO SAID JACKSON

SHOCK ABSORBER

Application filed October 11, 1927. Serial No. 225,453.

This invention relates to improvements in shock absorbers and the chief purpose thereof is to provide a shock absorber suitable for application to a motor vehicle to absorb the road shocks incident to travel thereof.

One object of the invention is to provide such a structure of simple sturdy character wherein improved means is employed to cushion the slight shocks in conjunction with other means operable to cushion the greater shocks.

A meritorious feature lies in the provision of such a structure wherein a compression chamber is employed which is partially filled with a liquid medium and which has an air dome wherein air is trapped by the liquid and mechanism is used which exerts a pressure upon the liquid in the compression chamber which in turn serves to compress the air in the air dome to cushion the slight shocks incident to road travel and the liquid itself is exhausted through a restricted opening to absorb the greater shocks incident to travel of the vehicle.

The several meritorious features of our improved structure, together with other advantages and objects thereof, will more fully appear from the following description of the illustrative embodiment shown in the accompanying drawing and defined in the appended claims.

The figure of the drawing is a vertical sectional view through our improved structure, illustrating the working parts thereof.

Shock absorbers of this general type are commonly used on motor vehicles and the compression chamber or receptacle is secured to one part of the vehicle such as the frame, and a connection leads from an operating member to another relatively moving part of the vehicle such as the axle so as to absorb the rebound of the body as the car travels over the road. To this extent our invention resembles others.

We provide a reservoir or casing, which is here indicated as 10, provided with a removable cap 12 through which fluid may be poured into the casing. This casing is divided into two compartments, 14 and 16, by a partition 18. The partition is shaped as at 20 to provide a cylinder opening at one end into the compartment 14 and at the other end into the compartment 16. A piston 22 is operatively disposed within the cylinder. The head of the piston is drilled out as at 24 to provide fluid passageways controlled by a ball check valve 26 which is carried within a cage 28 that is perforated as indicated at 30. A spring 32 holds the piston toward one end of the cylinder. An operating member 34, mounted upon a shaft 36, which is coupled to an arm 38, is employed to force the piston against the tension of the springs toward the compartment 16.

40 indicates a boss extending through compartment 16 through which a supporting rod may be passed. 42 indicates a screw-threaded cylinder plug. The two compartments communicate with each other through a restricted passageway 44, the opening through which is regulated by an adjustable member 46 which is bored out and carries a relief valve 48 held upwardly by a spring 50 to close an opening 52 having outlets 54. In the upper dome-shaped portion of the compartment 16 there is a ball check air valve 56 held upwardly by a spring 58 to close an inlet 60.

In operation, upon the downward movement of the car body, the piston travels outwardly under the impulse of the spring 32 and the ball check valve 26 opens, permitting the flow of liquid from compartment 4 into compartment 16. On the recoil the piston is forced toward the compartment 16 against the tension of the spring 32 and against the pressure of the fluid within such compartment 16, first acting to compress the air in the upper portion of compartment 16 above the liquid level to absorb the small or light shocks incident to travel of the car over the road and then acting to force the liquid through the restricted passageway 44 into the compartment 14. When the pressure exceeds a certain predetermined point, the valve 48 opens and increases the communicating passageway leading from chamber 16 into chamber 14.

What we claim is:

1. A shock absorber comprising a reservoir divided vertically by a partition into two compartments, a cylinder extending through said partition and opening into each compartment, a piston reciprocable in the cylinder, a check valve in the head of the piston, a restricted valve controlled opening through the partition, a spring urging the piston in one direction in the cylinder, an operating member to urge the piston in the opposite direction in the cylinder, and a liquid medium in the reservoir submerging the cylinder, and an air pocket above the liquid medium in that compartment toward which the piston is urged by the operating member.

2. A shock absorber having a reservoir divided into two compartments one being a compression compartment and the other a reservoir compartment, a cylinder open at one end into one compartment and at the opposite end into the other compartment, a working piston in the cylinder, an operating connection engaging the piston to move it through the cylinder, a check valve separating the two compartments adapted to close when the piston is being driven by the operating connection to exert a pressure upon the liquid in the compression compartment and to open when the piston is traveling in the opposite direction to admit liquid thereinto, and a restricted passageway leading from the compression compartment to the other to permit exhaust of liquid from the compression compartment into the reservoir compartment and means extending through the non-compression compartment and the liquid therein adjustable exteriorly the reservoir to vary the extent of the passageway leading from the compression compartment.

3. A shock absorber having a reservoir divided into two compartments, a cylinder open at one end into one compartment and at the opposite end into the other compartment, a working piston in the cylinder, an operating connection engaging the piston to move it through the cylinder, a check valve in the piston adapted to close when the piston is being urged through the cylinder by the operating connection and to open when the piston is traveling through the cylinder in the opposite direction, a restricted passageway leading from one compartment to the other and means associated therewith yieldable under pressure to increase the opening leading from one compartment to the other.

4. A shock absorber comprising a reservoir divided into two compartments communicating through a restricted passageway, a cylinder open into each compartment, a liquid medium in the reservoir submerging the cylinder, a working piston in the cylinder, and an operating connection engaging the piston to drive the same through the cylinder against the fluid pressure in the one compartment forcing liquid therefrom through the restricted passageway into the other compartment, and a valve controlled opening through the piston separating the compartments to permit the passage of liquid from one to the other in the opposite direction when the piston is moving in the opposite direction.

5. A shock absorber comprising a reservoir divided into two compartments communicating through a restricted passageway, a cylinder open at one end into one compartment and open at the other end into the other compartment, a liquid medium in the reservoir one compartment having an air space above the liquid medium therein, a piston operatively disposed in the cylinder, an operating member engaging the piston to drive it through the cylinder toward the compartment provided with the air space and counter the fluid pressure therein.

6. A shock absorber comprising a reservoir divided into two compartments communicating through a restricted passageway, a cylinder open at one end into one compartment and open at the other end into the other compartment, a working piston in the cylinder, an operating member engaging the piston to drive it through the cylinder toward one of the compartments, a liquid medium in said compartment to resist the movement of the piston thereinto, an air space in said compartment above the liquid medium and a pair of communicating check valves between said compartments below the liquid level, one opening into one compartment and the other opening into the other compartment.

7. A shock absorber having two compartments communicating through a restricted passageway, a cylinder opening at one end into one compartment and at the other end into the other compartment, a liquid medium submerging the cylinder in each compartment, one compartment provided with an air dome above the liquid medium, an air inlet check valve in said air dome, a working piston in the cylinder, a check valve controlled by the piston, and an operating member engaging the piston to drive it through the cylinder toward the compartment provided with the air dome to force liquid therefrom through the restricted passageway into the other compartment.

8. A shock absorber comprising a reservoir divided into two compartments communicating through a valve controlled passageway adapted to permit flow of liquid from one compartment into the other, a cylinder opening into each compartment, a liquid medium in one compartment, an air pocket in said compartment closed off by said liquid medium, a piston disposed within the cylinder, and operating mechanism coupled with the piston to actuate it to compress the liquid in said compartment against the resistance of the air in the air pocket to exhaust said liquid through the said valve controlled passageway from said compartment into the other compartment, said valve controlled passageway located below the liquid level.

9. A shock absorber comprising a reservoir divided into two compartments communicating through a restricted liquid passageway adapted to permit the flow of liquid from one compartment into the other, a liquid medium in said compartments maintained at a higher level than said restricted liquid passageway, an air pocket in one compartment in which air is trapped by said liquid medium above said liquid medium, a cylinder opening into each compartment, a piston operatively disposed in said cylinder to be actuated to compress the liquid medium in the one compartment against the air in said air pocket and to force the liquid from said compartment into the other compartment through said restricted liquid passageway, said piston provided with a valve controlled flow passageway through which liquid may pass in the reverse direction, and means adjustable exteriorly of the reservoir and extending through the wall thereof and through the liquid in one compartment to regulate the extent of the passageway leading from the other compartment.

In testimony whereof, we, ALBERT A. DOWD and HAROLD E. JACKSON sign this specification.

ALBERT A. DOWD.
HAROLD E. JACKSON.